(12) United States Patent
Abe et al.

(10) Patent No.: US 8,002,344 B2
(45) Date of Patent: Aug. 23, 2011

(54) TEMPERATURE ADJUSTABLE SEAT

(75) Inventors: Toshiyuki Abe, Yokohama (JP); Junichi Mita, Yokohama (JP); Tetsuro Takaba, Yokohama (JP); Nobuhiro Ono, Yokohama (JP); Shigeki Yamamoto, Yokohama (JP); Kazuhisa Nakagawa, Wako (JP); Kenichi Yoshikawa, Wako (JP)

(73) Assignee: Visteon Global Technologies, Inc., Van Buren Township, MI (US)

( * ) Notice: Subject to any disclaimer, the term of this patent is extended or adjusted under 35 U.S.C. 154(b) by 380 days.

(21) Appl. No.: 12/268,492

(22) Filed: Nov. 11, 2008

(65) Prior Publication Data

US 2009/0121524 A1 May 14, 2009

(51) Int. Cl.
*A47C 7/72* (2006.01)
*A47C 31/00* (2006.01)
(52) U.S. Cl. .............................. 297/180.13; 297/180.12
(58) Field of Classification Search .................... 62/3.2; 297/180.12, 180.1, 180.13, 180.14
See application file for complete search history.

(56) References Cited

U.S. PATENT DOCUMENTS

| 5,524,439 | A | * | 6/1996 | Gallup et al. | 62/3.5 |
| 6,079,485 | A | * | 6/2000 | Esaki et al. | 165/43 |
| 2006/0254284 | A1 | * | 11/2006 | Ito et al. | 62/3.3 |
| 2007/0234742 | A1 | * | 10/2007 | Aoki et al. | 62/3.3 |

FOREIGN PATENT DOCUMENTS

| JP | 04-045365 | 2/1992 |
| JP | 05 277020 | 10/1993 |
| JP | 2000-142069 | 5/2000 |
| JP | 2002 262962 | 9/2002 |

* cited by examiner

*Primary Examiner* — Milton Nelson, Jr.
(74) *Attorney, Agent, or Firm* — Dickinson Wright PLLC (57) ABSTRACT

A temperature adjustable seat is disclosed. The temperature adjustable seat comprises a seat and air being blown into an inside thereof a thermoelectric device for heating and cooling the air, an air-blower for blowing either heated air or cooled air by the thermoelectric device through the inside of the seat, and control device for controlling the thermoelectric device. The control device calculates a required heat quantity, the required heat quantity being a sum of a first heat quantity required for a seat surface temperature of the seat reaching to a target seat temperature and a second heat quantity that is given and received between the seat and an ambient environment and the control device controls a temperature of the thermoelectric device so as to supply the required heat quantity to the seat.

9 Claims, 10 Drawing Sheets

(a) TARGET TEMPERATURE AT TIME OF HEATING OPERATION (°C)

| MODE | OUTSIDE AIR TEMPERATURE (°C) | ELAPSED TIME (HEAT TIME(s)) | | | |
|---|---|---|---|---|---|
| | | ≦60 | 300 | 600 | 700≦ |
| HIGH | ≦0 | 42 | 42 | 39 | 39 |
| | 10 | 41 | 40 | 39 | 38 |
| | 30≦ | 36 | 36 | 36 | 36 |
| MID | ≦0 | 40 | 40 | 37 | 37 |
| | 10 | 39 | 38 | 36 | 36 |
| | 30≦ | 36 | 35 | 34 | 34 |
| LOW | ≦0 | 38 | 38 | 36 | 36 |
| | 10 | 36 | 36 | 35 | 35 |
| | 30≦ | 32 | 32 | 32 | 32 |

(b) TARGET TEMPERATURE AT TIME OF COOLING OPERATION (°C)

| MODE | OUTSIDE AIR TEMPERATURE (°C) | ELAPSED TIME (COOL TIME(s)) | | | |
|---|---|---|---|---|---|
| | | ≦120 | 600 | 1000 | 1200≦ |
| HIGH | ≦20 | 25 | 27 | 27 | 27 |
| | 30 | 23 | 23 | 25 | 26 |
| | 40≦ | 20 | 20 | 22 | 23 |
| MID | ≦20 | 26 | 28 | 29 | 29 |
| | 30 | 25 | 27 | 27 | 27 |
| | 40≦ | 23 | 23 | 27 | 27 |
| LOW | ≦20 | 31 | 31 | 31 | 31 |
| | 30 | 30 | 30 | 30 | 30 |
| | 40≦ | 26 | 26 | 29 | 29 |

(a)
FEEDFORWARD TERM TABLE (HEATING OPERATION)

| | | | | |
|---|---|---|---|---|
| 15V | 0 | 50 | 80 | 90 |
| 11V | 0 | 45 | 65 | 85 |
| 7V | 0 | 30 | 50 | 60 |
| 0V | 0 | 0 | 0 | 0 |
| | ≦0degC | 20degC | 50degC | 60degC≦ |

UNIT: % FOR MAXIMUM DRIVING ELECTRIC CURRENT
X-AXIS: CORRECTED TED REQUIRED HEAT QUANTITY − OUTSIDE AIR TEMPERATURE
Y-AXIS: AIR-BLOWER DRIVING VOLTAGE (VSP)

(b)
FEEDFORWARD TERM TABLE (COOLING OPERATION)

| | | | | |
|---|---|---|---|---|
| 15V | 0 | 60 | 90 | 100 |
| 11V | 0 | 50 | 70 | 90 |
| 7V | 0 | 30 | 50 | 80 |
| 0V | 0 | 0 | 0 | 0 |
| | ≦0degC | 4degC | 7degC | 8degC≦ |

UNIT: % FOR MAXIMUM DRIVING ELECTRIC CURRENT
X-AXIS: OUTSIDE AIR TEMPERATURE − CORRECTED TED REQUIRED HEAT QUANTITY
Y-AXIS: AIR-BLOWER DRIVING VOLTAGE (VSP)

(a) REFERENCE AIR-BLOWER DRIVING VOLAGE AT TIME OF HEATING OPEARTION

| MODE | OUTSIDE AIR TEMPERATURE (°C) | ELAPSED TIME (HEAT TIME(s)) | | |
|---|---|---|---|---|
| | | 100 | 1000 | 3000≦ |
| HIGH | <10 | 10 | 9 | 8 |
| | 10≦ | 9 | 8 | 7 |
| MID | <10 | 9 | 8 | 6 |
| | 10≦ | 8 | 7 | 6 |
| LOW | <10 | 8 | 7 | 5 |
| | 10≦ | 7 | 6 | 5 |

(b) REFERENCE AIR-BLOWER DRIVING VOLAGE AT TIME OF COOLING OPEARTION

| MODE | TED TEMPERATURE (°C) | ELAPSED TIME (COOL TIME(s)) | | |
|---|---|---|---|---|
| | | 100 | 1000 | 3000≦ |
| HIGH | <10 | 10 | 9 | 9 |
| | 10≦ | 11 | 11 | 11 |
| MID | <10 | 9 | 8 | 7 |
| | 10≦ | 10 | 10 | 9 |
| LOW | <10 | 8 | 7 | 6 |
| | 10≦ | 9 | 8 | 6 |

FIG. 11

TEMPERATURE ADJUSTABLE SEAT

BACKGROUND OF THE INVENTION

1. Field of the Invention

The present invention relates to a temperature adjustable seat suitable for a seat in a vehicle, and in particular to a temperature adjustable seat which controls a temperature of a seat by passing a temperature controlled air through an inside thereof.

2. Description of the Related Art

One example of a conventional temperature adjustable seat is disclosed in JP-A-05-277020. The temperature adjustable seat disclosed in JP-A-05-277020 has a structure in which an air heated or cooled by a Peltier device is sent into an inside of the seat by a fan, and then it is spurted from a surface of the seat. Then, an interior space in the car is made comfortable by spurring a cooled air therefrom during a summer, and by spurring a heated air therefrom during a winter.

Further, another example of a conventional temperature adjustable seat is disclosed in JP-A-2002-262962. The temperature adjustable seat disclosed in JP-A-2002-262962 has a structure in which an air heated by a heater is flowed into a cushion of the seat. Then, a temperature inside the vehicle is operated by increasing a flow rate of an air in the seat when the temperature inside the vehicle is higher, or by decreasing a ventilation volume of the seat when the temperature is lower, and also by controlling a flow rate of an air, based on a temperature difference between a surface temperature of the seat and a temperature of the heater.

In the meantime, a person seated on the seat will easily feel a surface temperature and temperature change of the seat because he/she is contacting the seat. As a result, it is desirable that a seat temperature of the temperature adjustable seat is controlled automatically so that the seat temperature reaches to a desired preset temperature and the preset temperature is maintained with high accuracy. In order to automatically control the seat temperature, normally, it is contemplated to simply feedback control a supply current to a Peltier device, heating means, and the like.

However, with such simple feedback control, the responsiveness of the seat surface temperature for a change in the supply current to a Peltier device and the likes is poor. The reasons thereof are that the heat capacity of the seat is large, the first order lag (e.g., a few seconds through a few minutes) is large, and further a wasted time (e.g., a few seconds through a few tens of seconds) required for the air whose temperature is controlled by Peltier device and heating means to reach to a sheet surface is not taken into consideration. As a result, with such simple feedback control, it is difficult to maintain the seat temperature to the preset temperature with high accuracy because the potential for an overshoot is large, and a convergence is poor.

Further, a Peltier device is such that output characteristics per each device a supply current would vary widely. Such variation in output characteristics also becomes a factor of deteriorating thermal control precision.

SUMMARY OF THE INVENTION

It is therefore an object of the present invention to provide a temperature adjustable seat capable of making a seat temperature conform to a target seat temperature with high accuracy and, without reducing responsiveness.

The above object is achieved according to the present invention by providing a temperature adjustable seat comprising a seat, an air being blown into an inside thereof, a thermoelectric device for heating and cooling the air, an air-blower for blowing either heated air or cooled air by said thermoelectric device through the inside of the seat, and a controller for controlling the thermoelectric device, said controller calculating a required heat quantity, said required heat quantity being a sum of a first heat quantity required for a seat surface temperature of the seat reaching to a target seat temperature and a second heat quantity that is related to the difference between the seat and an ambient environment, and controlling a temperature of the thermoelectric device and an output of said air-blower so as to the required heat quantity to the seat.

According to the present invention explained above, a controlled subject is changed from a seat temperature which is a conventional subject to be controlled to a temperature of the thermoelectric device in the medium of the required heat quantity for making that seat temperature conform to a target seat temperature. As a result, for the seat temperature, a high controllability is implemented while securing a rapid responsiveness.

That is, when a temperature of a thermoelectric device is set to a subject to be controlled, since a heat capacity of the thermoelectric device is small, a first order lag becomes small. Also, there is substantially no waste time, to a temperature variation of the thermoelectric device, for the electric current supplied to the thermoelectric device. Further, since the temperature of the thermoelectric device is set as the subject to be controlled, an effect of a variation in the output characteristics for the supplied electric current of the individual thermoelectric device can be avoided. As a result, a temperature control of the thermoelectric device has a good responsiveness.

Further, the temperature control of the thermoelectric device is performed based on the heat quantity which is required for controlling the seat temperature to conform to the target seat temperature. As a result, an overshoot of the seat temperature is suppressed, and the seat temperature is controlled with a good convergence.

Therefore, according to the temperature adjustable seat of the present invention, it is possible for the seat temperature to conform to the target seat temperature with high accuracy without reducing responsiveness.

In the present invention, preferably, said first heat quantity is expressed in a product of "a temperature difference between the seat surface temperature and the target seat temperature" and "a heat capacity of the seat."

According to the present invention explained above, the first heat quantity required for making the seat surface temperature approach to the target seat temperature is obtained. The first heat quantity becomes a main required heat quantity for a transient period.

In the present invention, preferably, said second heat quantity is expressed in a product of "a temperature difference between the seat surface temperature and the ambient environment temperature" and "a heat transfer coefficient between the seat and the ambient environment."

According to the present invention explained above, the second heat quantity which is given and received between the seat and the ambient environment, mainly, during the steady state period, is obtained. The second heat quantity becomes a main required heat quantity for the steady state period.

In the present invention, preferably, said controller calculates the required heat quantity by setting the first heat quantity to be zero in a case that a temperature difference between the seat surface temperature and the target seat temperature is equal to or less than a predetermined value.

According to the present invention explained above, the heat quantity to be transmitted between the seat surface and the ambient air is obtained as the required heat quantity.

In the present invention, preferably, the controller calculates a third heat quantity to be feedback based on a temperature difference between the seat temperature and the target seat temperature, and then calculates the required heat quantity by summing up the second heat quantity and the third heat quantity in a case that the temperature difference between the seat surface temperature and the target seat temperature is equal to or less than a predetermined value.

According to the present invention explained above, the seat temperature is controlled with accuracy even if an disturbance such as air flow around the seat and a variation of the temperature occurs, or even if the variations of the heat transfer coefficients according to the individual variability of the seats and passengers occurs, after the seat temperature reaches near the target seat temperature.

In the present invention, preferably, the controller calculates the target device temperature so that a supplied heat quantity, represented by a product of "a temperature difference between the target device temperature and a temperature of an air to be heated or cooled" and "a heat transfer coefficient between the thermoelectric device and an air," becomes equal to the required heat quantity, and the controller controls an electric current supplied to the thermoelectric device so that the temperature of the thermoelectric device becomes the target device temperature.

According to the present invention explained above, since the temperature control of the thermoelectric device has a small first order lag and substantially no waste time, the temperature control of the thermoelectric device has a good responsiveness with high accuracy. As a result, it is possible for the seat surface control to have a good responsiveness with high accuracy, by controlling the thermoelectric device so as to make the temperature of the thermoelectric device to be such a target device temperature.

In the present invention, preferably, the controller controls an output of the air-blower, based on a table set according to a temperature of an air to be heated and an elapsed time, at a time of a heating operation, and the controller controls an output of the air-blower, based on a table set according to a temperature of the thermoelectric device and an elapsed time, at a time of a cooling operation.

According to the present invention explained above, since the air-blower output is affected by the heat quantity supplied from the thermoelectric device to the seat, by controlling the air-blower based on the table, an interference between the temperature control of the thermoelectric device and the control of the air-blower can be avoided.

In the present invention, preferably, the controller controls the air-blower so as to increase an amount of air-blowing, when the target device temperature is higher than an upper limit temperature set in the thermoelectric device, and a temperature difference between the temperature of the thermoelectric device and the upper limit temperature is within a predetermined temperature, in a case of sending a heated air to said seat.

According to the present invention explained above, by an increase of the amount of air-blowing, the heat transfer coefficient from the thermoelectric device to the air rises. As a result, the temperature of the thermoelectric device required for supplying the same heat quantity is decreased.

In the present invention, preferably, the controller controls the air-blower so as to decrease an amount of air-blowing, when a supplied electric current of the thermoelectric device is an upper limit value set in the thermoelectric device, and the temperature of the thermoelectric device is lower than the target seat temperature, in a case of sending a heated air to said seat.

According to the present invention explained above, by a decrease of the amount of air-blowing, the temperature of the thermoelectric device rises. As a result, a cooled air is prevented from being supplied to the seat, whereas a user requests heating.

As explained above, according to the temperature adjustable seat of the present invention, a seat temperature can conform a target seat temperature with high accuracy, without reducing responsiveness.

The above and other objects and features of the present invention will be apparent from the following description by taking reference with accompanying drawings employed for preferred embodiments of the present invention.

DETAILED DESCRIPTION OF THE PREFERRED EMBODIMENTS

Hereinafter, the temperature adjustable seat according to the preferred embodiments of the present invention will be explained with reference to the drawings.

Figure 1:
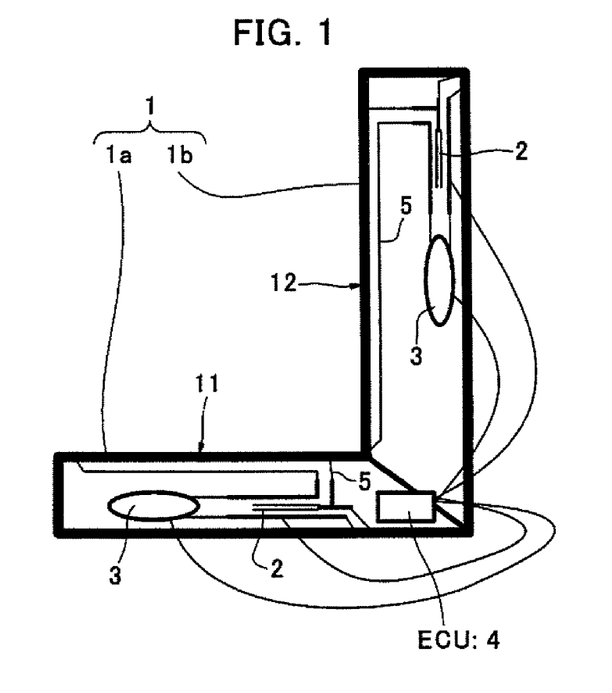
FIG. 1 is a schematic cross sectional view of a temperature adjustable seat according to an embodiment of the present invention.

At first, referring to FIG. 1, an exemplary temperature adjustable seat is illustrated. FIG. 1 is a schematic cross sectional view of a temperature adjustable seat. The temperature adjustable seat is provided with a seat 1 including a seat cushion 1a and a seat back 1b, and air is blown into the inside of the seat 1. The temperature adjustable seat is further provided with a thermoelectric device 2 for heating and cooling an air and an air-blower 3 for blowing the air heated or cooled by the thermoelectric device 2 in the insides of the seat cushion 1a and the seat back 1b of the seat 1, respectively. In addition, a lower part of the seat 1 is provided with an ECU 4 as controller for controlling the thermoelectric device 2 and the air-blower 3. Of course, the ECU 4 may be located in other positions.

Figure 2:
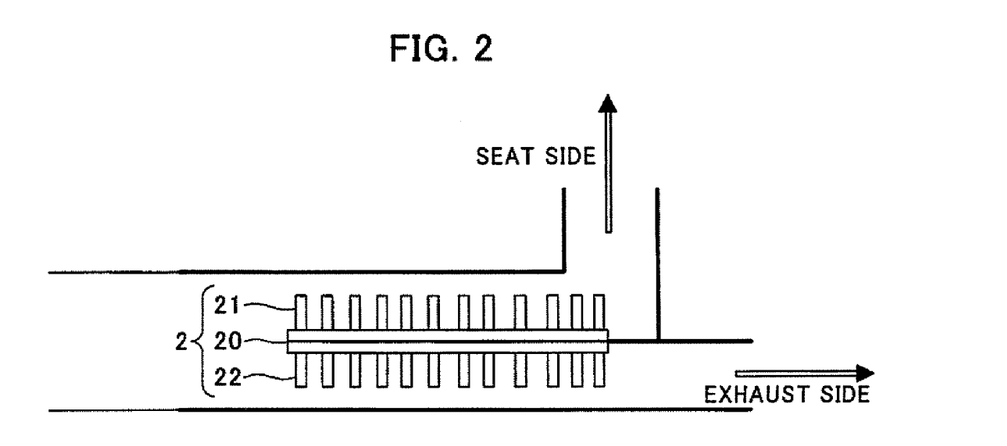
FIG. 2 is a schematic cross sectional view of a thermoelectric device.

Further, referring to FIG. 2, the thermoelectric device 2 according to the present embodiment will be described. FIG. 2 is an enlarged schematic view of the thermoelectric device 2. As shown in FIG. 2, the thermoelectric device 2 is generally comprised of a Peltier device 20, with a thermal control side heat sink 21, and an exhaust side heat sink 22. According to a direction of an electric current supplied to the Peltier device 20, the thermal control side heat sink 21 is heated or cooled, as well as the exhaust side heat sink 22 is cooled or heated. Then air heated or cooled by the thermal control side heat sink 21 is utilized for a thermal control of the seat 1.

In the meantime, in FIGS. 1 and 2, an arrangement for applying electrical powers to the thermoelectric device 2 and the air-blower 3 is not shown. Further, in a seat cushion surface 11 and a seat back surface 12 of the seat 1, there are provided sensors for detecting a seat surface temperature, respectively (not shown). In addition, in the thermal control side heat sink 21 of the thermoelectric device 2, there is provided a sensor for detecting a temperature of the thermoelectric device 2 (not shown). Although not illustrated, it may be arranged to thermally control both the seat cushion 1a and the seat back 1b of the seat 1 with one thermoelectric device.

Air heated or cooled by the thermoelectric device 2 is spurted from a large number of pores (not shown) on the seat cushion surface 11 and the seat back surface 12 of the seat 1, respectively such as, by passing through at least one blower tube 5 inside the seat 1.

A ventilation structure inside the seat 1 is not limited to the blower tube 5, but it may be a structure which spreads like a sheet, and can adopt any preferred one. Further, on the seat cushion surface and the seat back surface of the seat, the pores may be or may not be provided.

Figure 3:
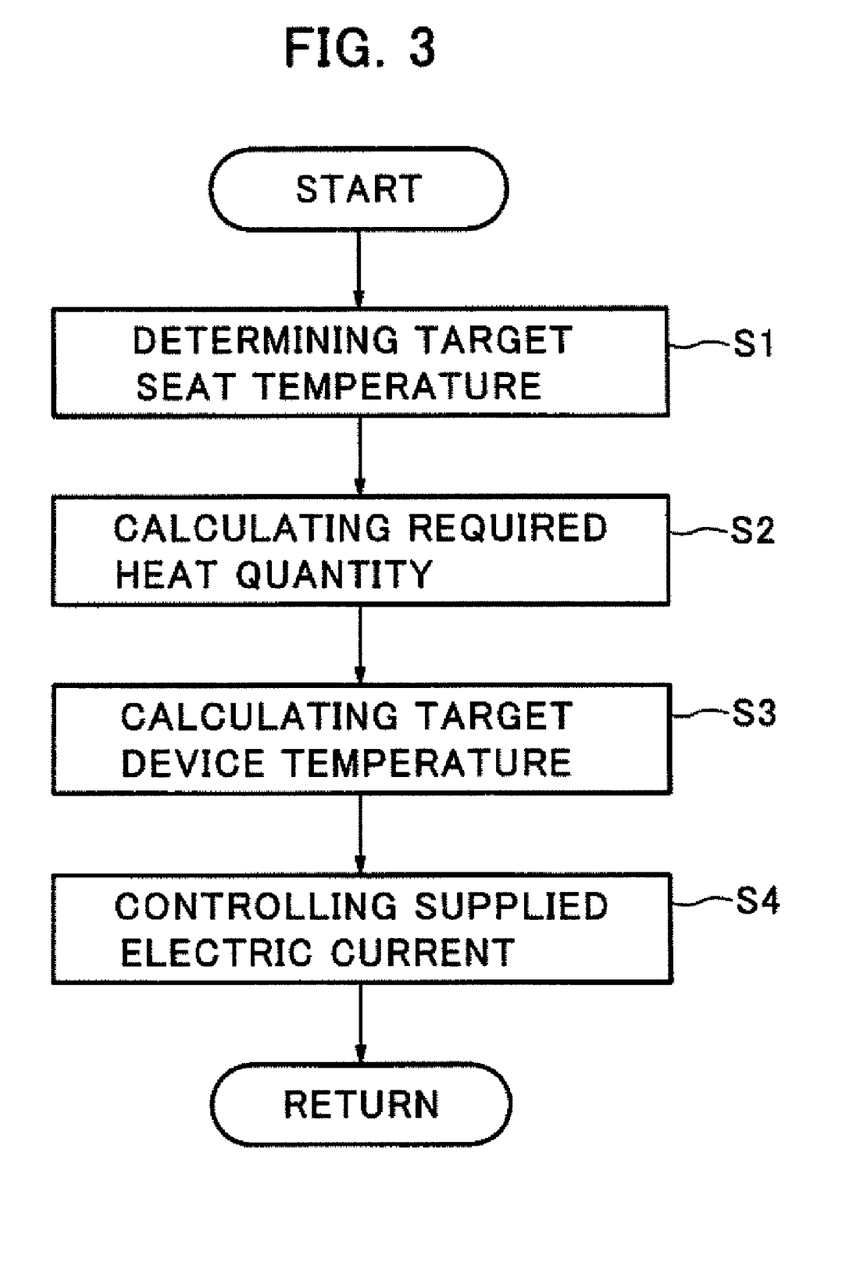
FIG. 3 is a flowchart for illustrating a control method of the temperature adjustable seat according to the embodiment of the present invention.

Next, referring to FIG. 3, a control method of a temperature adjustable seat according to the embodiment of the present invention will be described. FIG. 3 is a flowchart for illustrating an example of an operation of the temperature adjustable seat. As shown in FIG. 3, for a thermal control of the temperature adjustable seat, at first, a target seat temperature is determined (step S1). In the embodiment of the present invention, the target temperature is determined, based on a setting mode of a switch operated by a user, and a temperature of an ambient environment.

Figure 4:
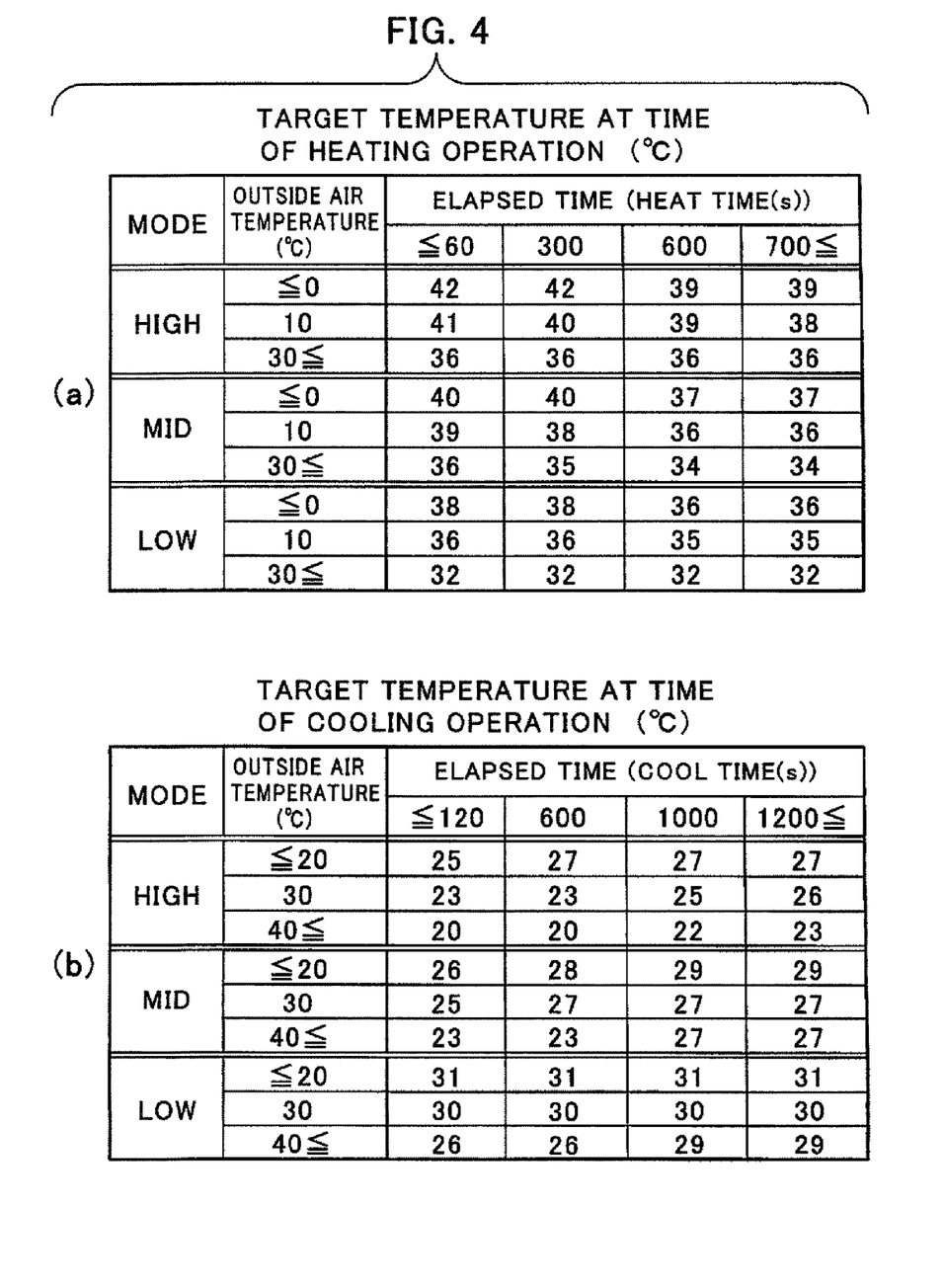
FIG. 4(a) is a table of the target seat temperature at a time of a heating operation.
FIG. 4(b) is a table of the target seat temperature at a time of a cooling operation.

FIG. 4(a) shows a target seat temperature table at a time of a heating operation. Also, FIG. 4(b) shows a target seat temperature table at a time of a cooling operation. As shown in the respective tables in FIGS. 4(a) and 4(b), the target seat temperatures are set based on the switch's setting modes of "HIGH". "MID" and "LOW", an ambient environment temperature (an outside air temperature), and an elapsed time from an operational start of the temperature adjustable seat or a setting change of the switch.

Further, the target seat temperature may be set to be a constant, to be independent on the elapsed time, or the target seat temperature may be varied according to the elapsed time. For example, immediately after starting an heating operation, the target temperature is set higher, and then after a predetermined time has elapsed, the target seat temperature may be lowered slightly. Also, for example, immediately after starting a cooling operation, the target temperature is set lower, and then after a predetermined time has elapsed, the target seat temperature may be raised higher slightly. The target seat temperature may be arranged so that a user may directly specify the temperature. The target temperatures between the respective cells in the tables of FIGS. 4(a) and 4(b) are obtained by linear interpolations.

Next, after having determined the target seat temperature, the ECU 4 calculates a required heat quantity (step S2 in FIG. 3).

The required heat quantity is, basically, a sum of a first heat quantity required for the seat surface temperature reaching to the target seat temperature and a second heat quantity to be given and received between the seat and the ambient environment.

The first heat quantity (Q1) per unit time is expressed by a product ($C \cdot \Delta\theta1$) of a temperature difference ($\Delta\theta1$) between the seat surface temperature ($\theta s$) and the target seat temperature ($\theta sp$) and a heat capacity (C) of the seat 1, and then it is divided by a control target time constant, e.g. a waste unit (s). The second heat quantity (Q2) per unit time is expressed by a product ($K1\Delta\theta2$) of a temperature difference ($\Delta\theta2$) between the seat surface temperature ($\theta s$) and the target seat temperature ($\theta\alpha$) and a heat transfer coefficient per unit time (K1) between the seat 1 and the ambient environment.

Therefore, the required heat quantity per unit time (Qr) is expressed in the equation (1) as shown below.

$$Qr = Q1 + Q2 = C \cdot \theta1/s + K1 \cdot \Delta\theta2 \quad (1)$$

In the meantime, the temperature ($T\alpha$) of the ambient environment can be detected or calculated in an optionally preferable method. For example, it may be detected by a temperature sensor(s) arranged at the periphery of the seat, or a temperature of an air transmitted to the thermoelectric device 2 may be detected by a sensor(s). The values of the heat quantity (C), the coefficient of heat transfer (K) and the waste time (s) of the seat 1 may be obtained experimentally, respectively. The waste time (control target time constant) (s) becomes smaller as the driving voltage of the air-blower 3 (the air-blower output) becomes larger, and it becomes larger as the air blower output becomes smaller. The control target time constant is such that a preferred value thereof may be obtained experimentally.

Such required heat quantity is a maximum supply heat quantity which the seat surface temperature can transit to a steady state without producing an overshoot, at a time of a transient state being separated away from the target seat temperature. The seat surface temperature is set to reach to the target seat temperature, in the waste time (s) in which the air heated or cooled by the thermoelectric device reaches to the seat surface. The required heat quantity is calculated and updated every 100 milliseconds, for example, during a transient period.

When the seat surface temperature approximately matches the target seat temperature (when it is in a steady state), the temperature difference ($\Delta\theta1$) between the seat surface temperature ($\theta s$) and the target seat temperature ($\theta sp$) is small, and a temperature variation per unit time is also small. As a result, assuming the first heat quantity (Q1) to be zero, the required heat quantity is calculated.

However, in that case, in order to deal with a disturbance such as an air flow around the seat and a variation of a temperature, or in order to correct the variations of the heat transfer coefficients depending on the seats and individual variabilities of passengers and the like, and/or control (system) deviations by errors and the like of the detected temperatures, a third heat quantity (Q3) to be feedback is further calculated, and the required heat quantity (Qr) may be calculated by summing up the second heat quantity (Q2) and the third heat quantity (Q3).

The third heat quantity (Q3) per unit time is expressed in the equation (2) shown below as a sum of product ($Kp \cdot \Delta\theta1$) of which a temperature difference ($\Delta\theta 1$) between the seat surface temperature ($\theta s$) and the target seat temperature ($\theta sp$) is multiplied by a coefficient (Kp) of a P (proportional) term of a closed loop in a PID feedback control, and an integrated value of a product ($Ki\Delta\theta 1$) of which a temperature difference ($\Delta\theta 1$) between the seat surface temperature ($\theta s$) and the target seat temperature ($\theta sp$) is multiplied by a coefficient (Ki) of an I (integral) term of the closed loop.

$$Q3 = Kp \cdot \Delta\theta 1 + \Sigma Ki \cdot \Delta\theta 1 \qquad (2)$$

The coefficient (Kp) of the P term of the closed loop and the coefficient (Ki) of the I term of the closed loop may be experimentally obtained, respectively, in consideration of the individual variability and the like of the thermoelectric devices and the seats.

Therefore, the required heat quantity (Qr) per unit time when it is in a steady state is expressed by an equation (3) shown below.

$$Qr = Q1 + Q2 + Q3 = 0 + H \cdot \Delta\theta 2 + Kp \cdot \Delta\theta 1 + \Sigma(Ki \cdot \Delta\theta 1) \qquad (3)$$

In order to enhance a stability at a time of an overshoot, the required heat quantity (Qr) per unit time in a steady state may be calculated as the equation (4) shown below. Using a temperature difference ($\Delta\theta 2'$) between the target seat temperature ($\theta sp$) and the ambient environment temperature ($\theta\alpha$), in place of the temperature difference ($\Delta\theta 2$) in the aforementioned equation (3).

$$Qr = Q1 + Q2 + Q3 = 0 + K1 \cdot \Delta\theta 2' + Kp \cdot \Delta\theta 1 + \Sigma(Ki \cdot \Delta\theta 1) \qquad (4)$$

Figure 5:
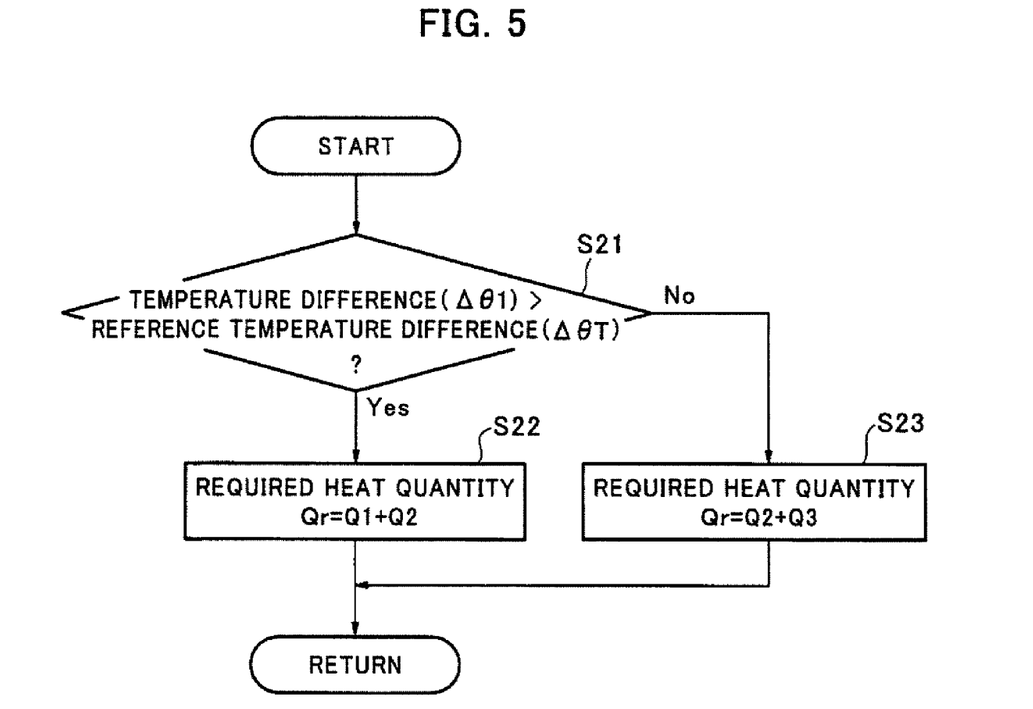
FIG. 5 is a flowchart for illustrating the calculation of the required heat quantity.

Then, as shown in a flowchart of FIG. 5, a determination whether the cooling or heating operation is in a transient period or a steady period is made by comparing a temperature difference ($\Delta\theta 1$) between the seat surface temperature ($\theta s$) and the target seat temperature ($\theta sp$), with a predetermined reference temperature difference ($\Delta\theta T$) (step S21).

If the temperature difference ($\Delta\theta 1$) is larger than the reference temperature difference ($\Delta\theta T$) (in case of "Yes" at the step 21), the required heat quantity (Qr) is calculated according to the aforementioned equation (1), as the transient period (step 22).

The reference temperature difference ($\Delta\theta T$) may be optionally set to a preferable value according to a control accuracy to be required. Since a person being seated on the seat contacts the seat, it is desirable for the temperature control seat to control the temperature with much higher precision than an air conditioner for a temperature control in a room space, for example, a car air conditioner which controls a temperature of an entire compartment space of a vehicle.

On the other hand, if the temperature difference ($\Delta\theta 1$) is equal to or less than the reference temperature difference ($\Delta\theta T$) (in case of "No" at the step 21), the required heat quantity (Qr) is calculated according to the aforementioned equations (3) or (4), as the steady period (step 23).

Next, the ECU or controller 4 calculates a target device temperature (step S3 in FIG. 3).

The target device temperature ($\theta dp$) is calculated so that a supplied heat quantity expressed by a product ($H \cdot \Delta\theta 3$) of a temperature difference ($\Delta\theta 3$) between the target device temperature ($\theta dp$) and the temperature ($\theta\alpha$) of an air to be heated or cooled and the heat transfer coefficient (H) between the thermoelectric device 2 and an air, becomes equal to a required heat quantity (Qr) per unit time. That is, a relation in the following equation (5) is worked out.

$$H \cdot \Delta\theta 3 = Qr \qquad (5)$$

Therefore, the target device temperature ($\theta dp$) is obtained as the equation (6) shown below, from the aforementioned equation (5).

$$\theta dp = \theta\alpha + Qr/H \qquad (6)$$

The coefficient of the heat transfer (H) is a value inherent to a thermoelectric device, and thus is a value that is obtained by a design and an experiment. The coefficient of the heat transfer (H) depends on an amount of an air-blow by the air-blower, and is approximately proportional to a square root of the amount of air-blow. The amount of air-blow also depends on an applied voltage of the air-blower.

However, in the present embodiment, an upper limit value is set to the target device temperature ($\theta dp$). Such upper limit value is determined to be a value of either the lowest upper temperature limit or upper limit temperature, for example, among an upper temperature limit of a thermoelectric device itself, an upper temperature limit of a structure around the thermoelectric device, or an upper limit temperature of a seat, and the like.

The upper limit temperature of the seat may be a fixed value, or may be set to a temperature of which a predetermined temperature is added to the target seat temperature.

Next, the ECU or controller 4 controls an electrical current to be supplied to the thermoelectric devices 2 so that the thermoelectric device 2 becomes the target device temperature ($\theta dp$) (step S4 in FIG. 3).

In the present embodiment, the supplied electrical current is controlled in a combination of a feedback control and a feed-forward control. In the feedback control, the supplied electrical current is controlled in a negative feedback control of a PID control and the like, based on the temperature difference ($\Delta\theta 4$) between the target device temperature ($\theta dp$) and the temperature ($\theta d$) of the thermoelectric device. In the feed-forward control, the supplied electrical current of the thermoelectric device is controlled, from the output characteristics of the thermoelectric device 2, based on the temperature difference ($\Delta\theta 5$) between the target device temperature ($\theta dp$) and the temperature ($\theta\alpha$) of the air heated or cooled, and a driving power of the air-blower (an air-blower output).

In the control of the supplied electric current, an amount of an electric current may be controlled directly, or a duty-control may be performed.

As the variation of the output characteristics of the thermoelectric device 2 becomes smaller and smaller, a ratio of the feed-forward control can be increased. Also, as the response of the temperature of the thermoelectric device 2 to the supplied electric current becomes higher and higher, a ratio of the feedback control can be increased.

Figure 6:
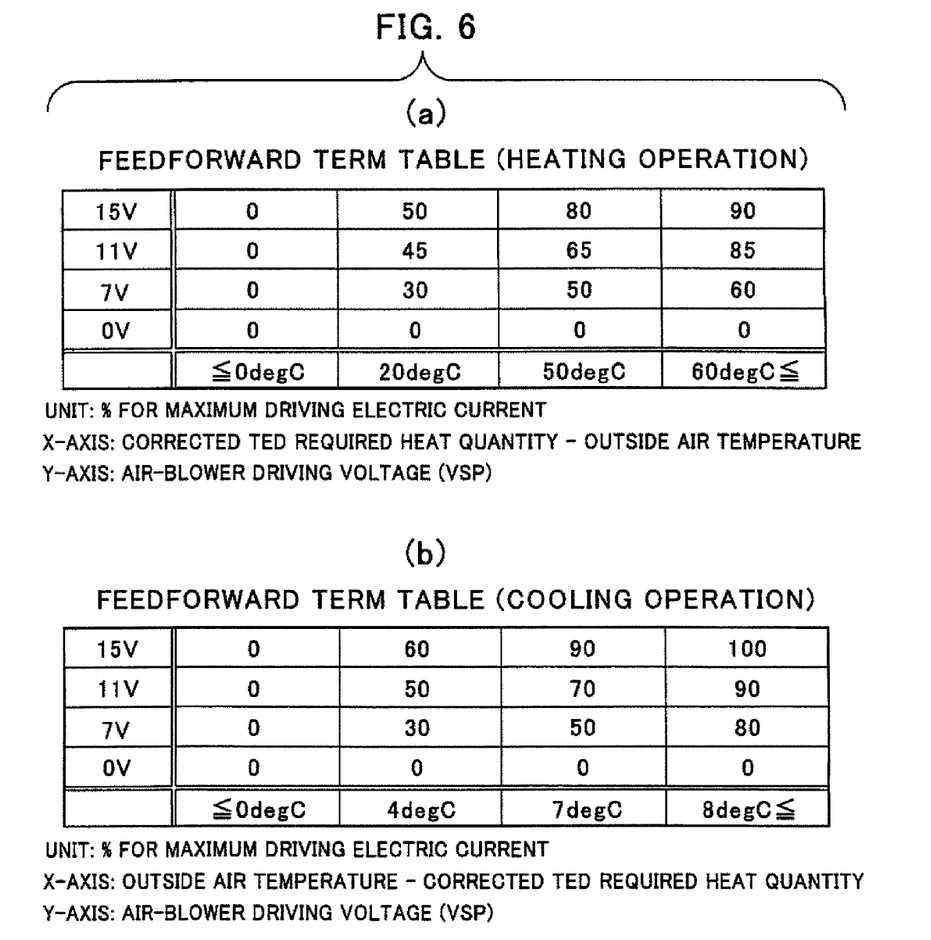
FIG. 6(a) is a table of the feed-forward term in the control of the electric current supplied to the thermoelectric device at a time of a heating operation.
FIG. 6(b) is a table of the feed-forward term in the control of the electric current supplied to the thermoelectric device at a time of a cooling operation.

An amount of the feed-forward control among the supplied electric currents may be set in the table based on the temperature difference ($\Delta\theta 5$) between the target device temperature ($\theta dp$) and the temperature ($\theta\alpha$) of the air heated or cooled, and the driving power of the air-blower 3. In FIG. 6($a$), there is shown a table of the amounts of the supplied electric currents by the feed-forward control at a time of a heating operation. In FIG. 6($b$), there is shown a table of the amounts of the supplied electric currents by the feed-forward control at a time of a cooler operation. As shown in the tables in FIGS. 6($a$) and 6($b$), as the air-blower output is higher and higher, and also the temperature difference ($\Delta\theta 5$) becomes larger and larger, the amount of electric current in the feed-forward control becomes higher.

As such, the temperature control of the thermoelectric device by the supplied electric current has a good responsiveness, and can be made with high accuracy. Then, the target device temperature of the thermoelectric device is set from the target seat temperature of the seat surface temperature, by the medium of the required heat quantity. Therefore, the seat surface temperature can be controlled with a good responsiveness as well as with high accuracy, by controlling the temperature of the thermoelectric device.

Herein, with reference to the time-chart in FIG. 7, an example of controlling the temperature control seat at a time of a heating operation will be described. A vertical axis at an upper level in FIG. 7 represents a temperature (° C.), and a vertical axis at middle level represents a duty ratio of the supplied electric current to the thermoelectric device 2, and a vertical axis at the lower level represents the driving voltage of the air-blower 3 (the air-blower output), respectively.

Figure 7:
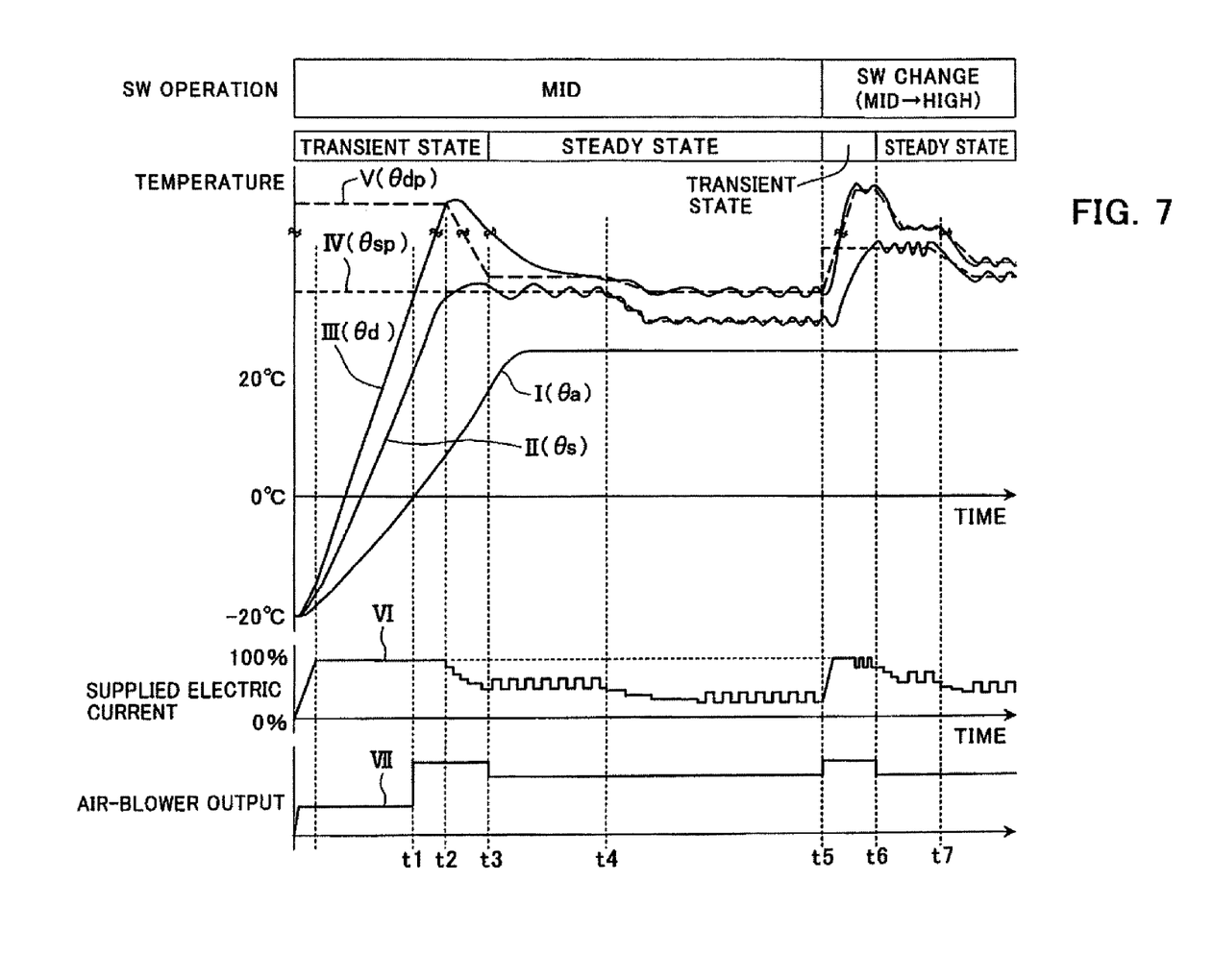
FIG. 7 is a time-chart at a time of a heating operation.

Among the upper level in FIG. 7, a curve I represents the ambient environment temperature ($\theta\alpha$), a curve II represents the temperature ($\theta s$) of the seat surface, a curve III represents the temperature ($\theta d$) of the thermoelectric device 2. A broken line IV represents the target seat temperature ($\theta sp$), and a broken line V represents the target device temperature ($\theta dp$), respectively. A curved line VI at the middle level represents the supplied electric current to the thermoelectric device 2. A curved line VII at the lower level represents the air-blower output.

In the example shown in FIG. 7, a heater control starting from a temperature of −20° C. is shown. At first, as a heater strength "MID" is set in a switch operation, for example, based on the table shown in FIG. 4(a). As shown in the curved line IV, the target seat temperature ($\theta sp$) is set to 40° C., for example. Then, for the target seat temperature ($\theta sp$) the target device temperature ($\theta dp$) is calculated, based on the aforementioned equation (1). However, because the calculated value of the target device temperature ($\theta dp$) is higher than the upper limit temperature, the target device temperature ($\theta dp$) is limited to the upper limit value, as shown in the curved line V.

A heater is operated at a maximum output of the duty ratio 100% of the supplied electric current until at the time t2 when the temperature ($\theta d$) of the thermoelectric device reaches to the target device temperature ($\theta dp$).

Until at a time t1 when the temperature ($\theta d$) of the thermoelectric device reaches to the target seat temperature ($\theta sp$), for heating the thermoelectric device rapidly, and for suppressing a cooled air spurting from the seat, the air-blower output is suppressed to 5V as shown in the curved line VII. Then, from the time t1 to the time t3, in order to perform an efficient heating, the air-blower output becomes higher as 9V.

From the time t2 to the time t3, the target device temperature ($\theta dp$) is calculated sequentially, based on the aforementioned equation (1). Because the seat surface temperature ($\theta s$) rises and approaches to the target seat temperature ($\theta sp$), the target device temperature ($\theta dp$) shown in the curved line V decreases. With a decrease of the target device temperature ($\theta dp$), the duty ratio of the supplied electric current also decreases, as shown in the curved line VI. As a result, the seat surface temperature ($\theta s$) reaches to the target seat temperature ($\theta sp$) with a good convergence, by avoiding a large overshoot.

From time t3 to the time t4, since the temperature difference ($\Delta\theta 1$) between the seat surface temperature ($\theta s$) and the target seat temperature ($\theta sp$) is small, the target device temperature ($\theta dp$) is calculated, based on the aforementioned equation (3) in the steady state. As a result, the seat surface temperature ($\theta s$) conforms to the target seat temperature ($\theta sp$) with accuracy. After the time t3, the air-blower output decreases to 8V to reduce a noise of the air-blower.

After the time t4, the target seat temperature ($\theta sp$) is lowered from 40° C. to 37° C. automatically, for maintaining a user's comfort. A timing of lowering the target seat temperature ($\theta sp$) and a temperature drop range thereof may be set in the table shown in FIG. 4(a) and the likes, for example.

As the heater strength "MID" is changed to "HIGH" in the further switch operation at the time t5, the target seat temperature ($\theta sp$) is reset to 42° C., for example, as shown in the curved line IV, based on the table shown in FIG. 4(a), for instance. Then, for a new target seat temperature ($\theta sp$), the target device temperature ($\theta dp$) is calculated, based on the aforementioned equation (1). However, because the calculated value of the target device temperature ($\theta dp$) is higher than the limited temperature, the target device temperature ($\theta dp$) is limited to the upper limit value, as shown in the curved line V.

Until the time t6 when the temperature ($\theta d$) of the thermoelectric device approaches to the target device temperature ($\theta dp$), a heating is performed with a high output of which the duty ratio of the supplied electric current is near 100%. In order to perform an efficient heating, the air-blower output also becomes higher to 10V.

After the time t6, since the temperature difference ($\Delta\theta 1$) between the seat surface temperature ($\theta s$) and the target seat temperature ($\theta sp$) is small, again, the target device temperature ($\theta dp$) is calculated, based on the aforementioned equations (3) or (4) in the steady state. Then, as the temperature ($\theta d$) of the thermoelectric device to be a new target device temperature ($\theta dp$), the supplied electric current to the thermoelectric device is controlled. As a result, the seat surface temperature ($\theta s$) conforms to the target seat temperature ($\theta sp$) with accuracy. After the time t6, the air-blower output decreases to 9V to reduce a noise of the air-blower.

As such, the seat surface temperature of the temperature control seat in a heating operation reaches to a desirable preset temperature rapidly by controlling the temperature of the thermoelectric device in the medium of the required heat quantity, and as the preset temperature to be maintained with high accuracy, it is controlled automatically.

Next, referring to a time-chart of FIG. 8, an example of controlling the temperature control seat at a time of a cooler operation will be described. A vertical axis at an upper level in FIG. 8 represents a temperature (° C.), and a vertical axis at a middle level represents a duty ratio of the supplied electric current to the thermoelectric device 2, and a vertical axis at the lower level represents the driving voltage of the air-blower 3 (the air-blower output), respectively.

Figure 8:
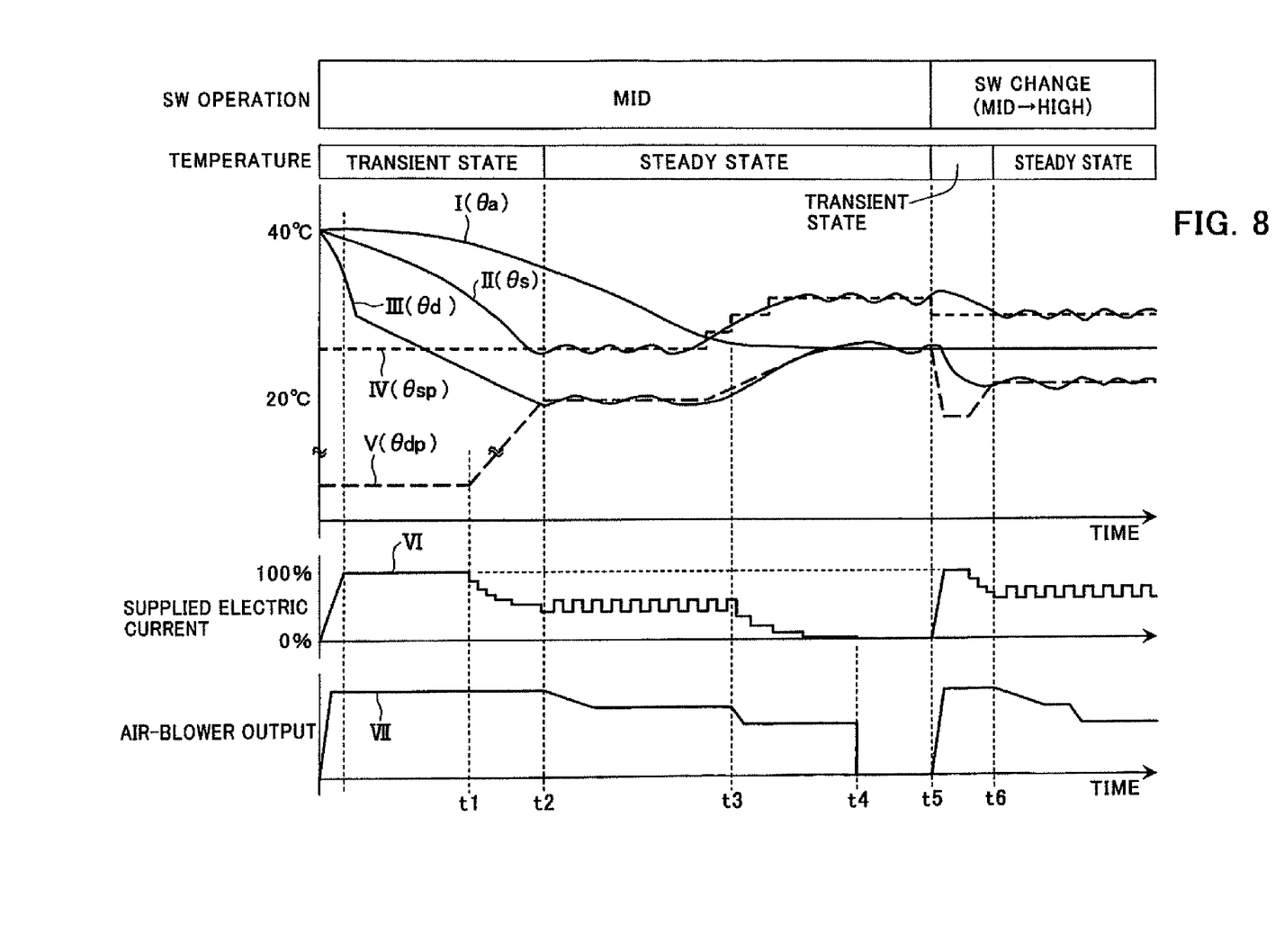
FIG. 8 is a time-chart at a time of a cooling operation.

Among the upper level in FIG. 8, a curve I represents the ambient environment temperature ($\theta\alpha$), a curve II represents the temperature ($\theta s$) of the seat surface, and a curve III represents the temperature ($\theta d$) of the thermoelectric device 2. A broken line IV represents the target seat temperature ($\theta sp$), and a broken line V represents the target device temperature ($\theta dp$), respectively. A curved line VI at the middle level represents the supplied electric current to the thermoelectric device 2. A curved line VII at the lower level represents the air-blower output.

In the example shown in FIG. 8, a cooling control from a temperature of 40° C. is shown. At first, as a cooling strength "MID" is set in a switch operation, for example, based on the table shown in FIG. 4(b), as shown in the curved line IV, the target seat temperature ($\theta sp$) is set to 23° C., for example. Then, for the target seat temperature ($\theta sp$), the target device temperature ($\theta dp$) is calculated, based on the aforementioned equation (1).

A cooling control is operated in a maximum output of the duty ratio 100% of the supplied electric current until at the time t1 when the temperature ($\theta d$) of the thermoelectric device reaches to the target device temperature ($\theta dp$). Because, a cooling efficiency also becomes higher as the air-blower output becomes higher, the air-blower output also becomes higher as 11V until the time t1.

From the time t1 to the time t2, the target device temperature ($\theta$dp) is calculated sequentially, based on the aforementioned equation (1). Because the seat surface temperature ($\theta$s) decreases and approaches to the target seat temperature ($\theta$sp), the target device temperature ($\theta$dp) shown in the curved line V rises. With a rise of the target device temperature ($\theta$dp), the duty ratio of the supplied electric current also decreases, as shown in the curved line VI. As a result, the seat surface temperature ($\theta$s) reaches to the target seat temperature ($\theta$sp) with a good convergence, by avoiding a large overshoot.

From time t2 to the time t3, since the temperature difference ($\Delta\theta$1) between the seat surface temperature ($\theta$s) and the target seat temperature ($\theta$sp) is small, the target device temperature ($\theta$dp) is calculated, based on the aforementioned equations (3) or (4) in the steady state. As a result, the seat surface temperature ($\theta$s) conforms to the target seat temperature ($\theta$sp) with accuracy. After the time t2, the temperature ($\theta$d) of the thermoelectric device also decreases, and the air-blower output decreases to 8V to reduce a noise of the air-blower.

After the time t3, the target seat temperature ($\theta$sp) rises, for example, from 23° C. to 27° C. step wise, automatically, for maintaining a user's comfort. A timing and a temperature rise range of rising the target seat temperature ($\theta$sp) may be set in the table shown in FIG. 4(b) and the like, for example.

After the time t4, because the temperature ($\theta\alpha$) of the air to be cooled is decreased to the target device temperature ($\theta$dp), the duty ratio of the supplied electric current to the thermoelectric device 2 is set to 0%, and the air-blower is stopped.

As the cooling strength "MID" is changed to "HIGH" in the further switch operation at the time t5, the target seat temperature ($\theta$sp) is reset to 20V, for example, as shown in the curved line V, based on the table shown in FIG. 4(b), for instance. Then, for a new target seat temperature ($\theta$sp), the target device temperature ($\theta$dp) is calculated, based on the aforementioned equation (1).

Until the time t6 when the temperature ($\theta$d) of the thermoelectric device decreases and approaches to the target device temperature ($\theta$dp), a cooling is performed with a high output of which the duty ratio of the supplied electric current is near 100%. In order to perform an efficient cooling, the air-blower output also becomes higher to 11V.

After the time t6, since the temperature difference ($\Delta\theta$1) between the seat surface temperature ($\theta$s) and the target seat temperature ($\theta$sp) is small, again, the target device temperature ($\theta$dp) is calculated, based on the aforementioned equations (3) or (4) in the steady state. Then, as the temperature ($\theta$d) of the thermoelectric device to be a new target device temperature ($\theta$dp), the supplied electric current to the thermoelectric device is controlled. As a result, the seat surface temperature ($\theta$s) conforms to the target, seat temperature ($\theta$sp) with accuracy.

As such, the seat surface temperature of the temperature control seat in a cooling operation reaches to a desirable preset temperature rapidly, by controlling the temperature of the thermoelectric device in the medium of the required heat quantity, and as the preset temperature to be maintained with high accuracy, it is controlled automatically.

Figure 9:
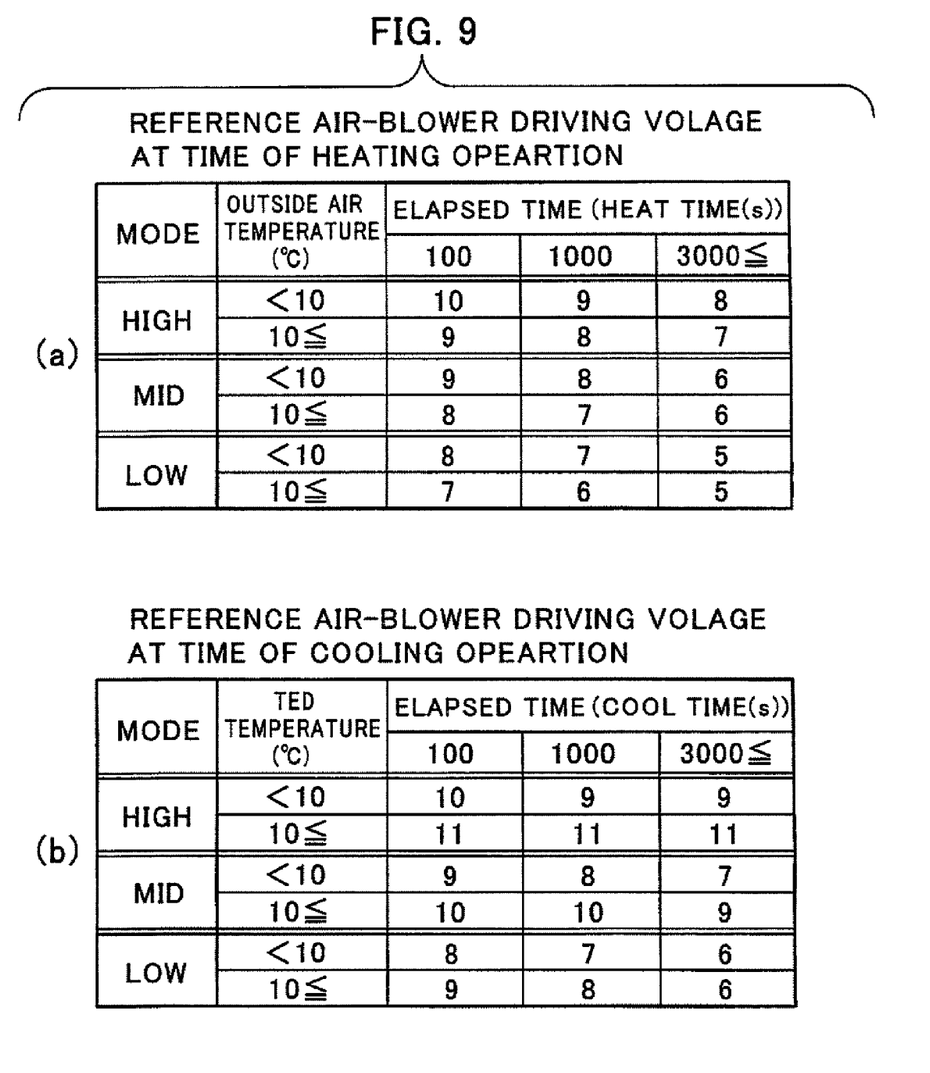
FIG. 9(a) is a table of the driving voltage of the air-blower at a time of a heating operation.
FIG. 9(b) is a table of the driving voltage of the air-blower at a time of a cooling operation.

The output (driving voltage) of the air-blower may be controlled, based on the table being set according to the temperature of the air to be heated and the elapsed time, in the heating operation, as shown in FIG. 9(a). Also, in the cooling operation, as shown in FIG. 9(b), the output of the air-blower may be controlled, based on the table being set according to the temperature of the thermoelectric device (TED) and the elapsed time. As such, by controlling the air-blower based on the tables being set, an interference of the temperature control of the thermoelectric device with the control of the air-blower can be avoided.

In FIGS. 9(a) and 9(b), the reference air-blowing driving voltages of the air-blower are changed, according to the elapsed times from the operation starting time or the switch operation. As such, by decreasing the output of the air-blower along with the elapsed time, both the temperature control and the reduction of the air-blower's noise are contemplated.

Next, referring to the flowchart of FIG. 10 and the time-chart of FIG. 11, the case will be described in which the driving voltage of the air-blower is controlled beyond the reference air-blowing driving voltage being set in FIG. 9(a), at a time of heating.

Figure 11:
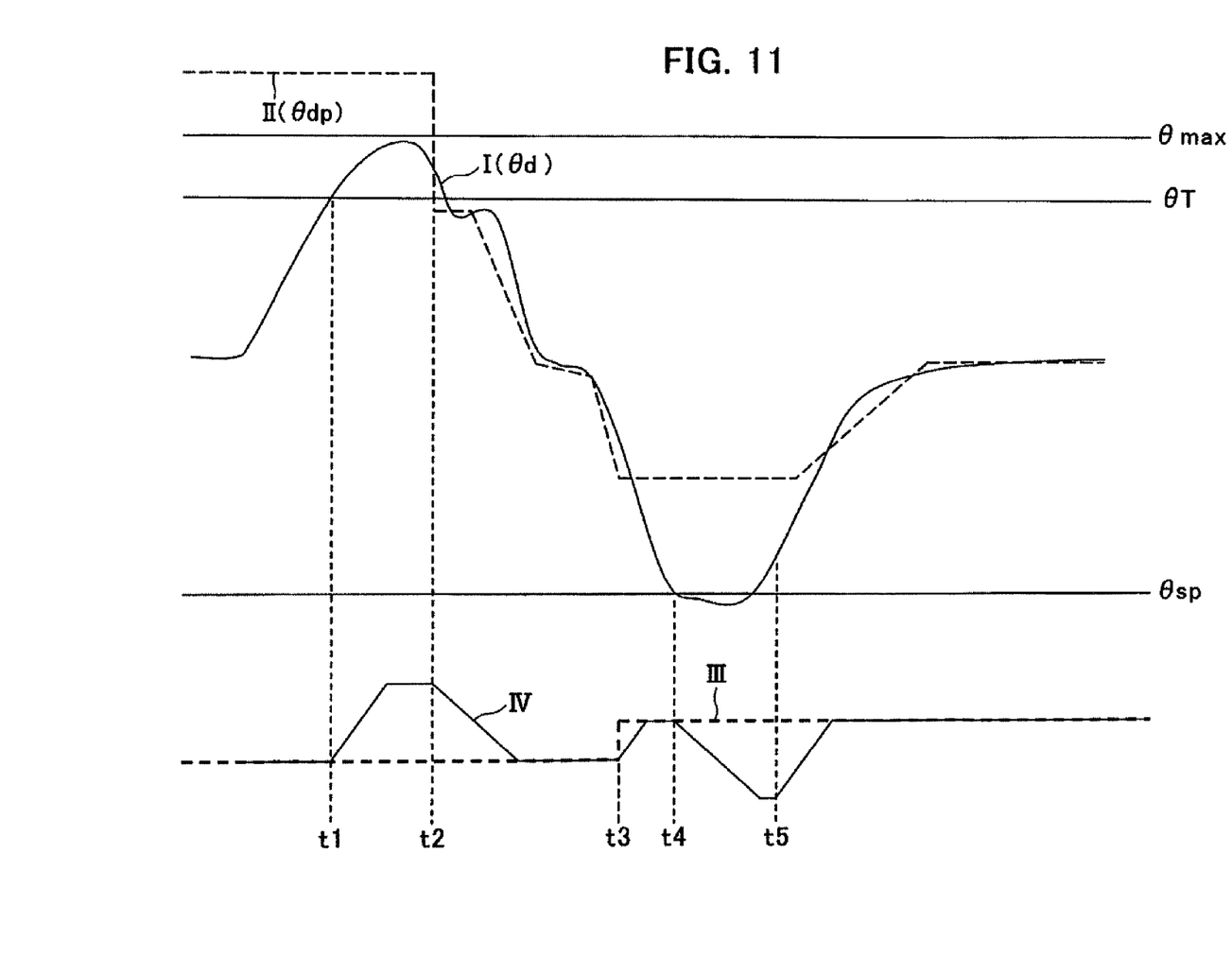
FIG. 11 is a time-chart for illustrating the control of the driving voltage of the air-blower.

A curved line I in the time-chart of FIG. 11 represents the temperature ($\theta$d) of the thermoelectric device, and a broken line II represents the target device temperature ($\theta$dp) respectively. A broken line III represents the reference air-blowing driving voltage, and a line IV represents the driving voltage of the air-blower, respectively.

Figure 10:
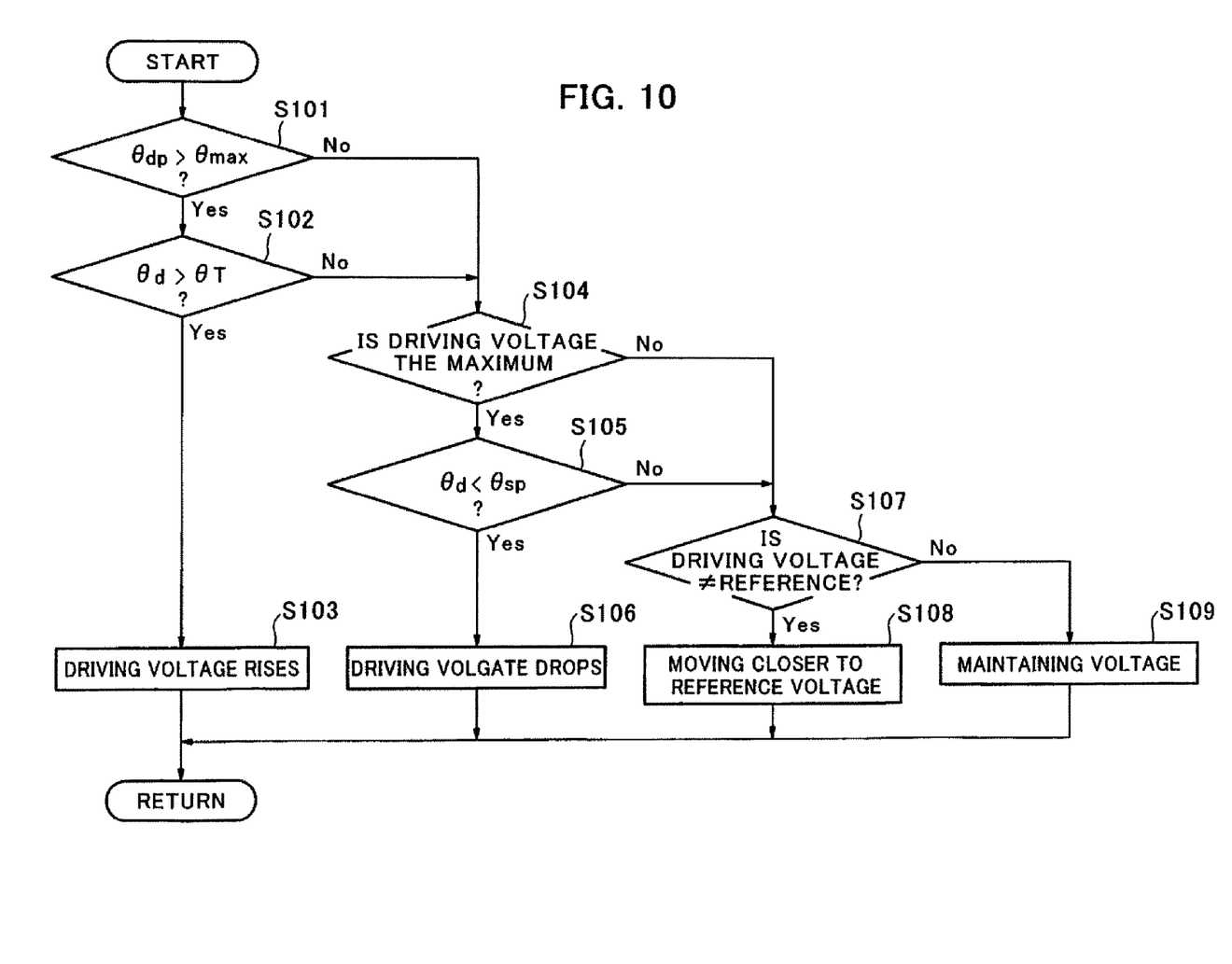
FIG. 10 is a flowchart for illustrating the control of the driving voltage of the air-blower.

At a time t1 in the time-chart of FIG. 11, the target device temperature ($\theta$dp) shown in the broken line II becomes higher than the upper limit temperature ($\theta$ max) being set in the thermoelectric device ("Yes" in S101 of FIG. 10). Then, the temperature difference between the temperature ($\theta$d) of the thermoelectric device shown in the curved line I and the upper limit temperature ($\theta$ max) is within a predetermined temperature ("Yes" in S102). That is, the temperature ($\theta$d) of the thermoelectric device is higher than a predetermined reference temperature ($\theta$T). In this case, the air-blower driving voltage of the air-blower is risen with a predetermined gradient so that an amount of air-blowing is increased (S103).

As such, by increasing the amount of air blowing, a thermal conductivity from the thermoelectric device to an air rises. As a result, the maximum heat quantity is supplied within a range in which the temperature of the thermoelectric device is kept equal to or less than an upper limit temperature.

Then, until the time t2, the air-blower is still driven with the maximum output. After the time t2, because the target device temperature ($\theta$dp) has become equal to or less than the upper limit temperature ($\theta$ max) ("No" in S101), the air-blower driving voltage approaches to the reference air-blower driving voltage with a predetermined gradient (S108).

By rising or decreasing the air-blower driving voltage with the predetermined gradient, an interference with the control of the thermoelectric device can be avoided.

In a case that the supplied electric current of the thermoelectric device is an upper limit value being set in the thermoelectric device ("Yes" in S104), at the time t4, the temperature ($\theta$d) of the thermoelectric device becomes lower than the target seat temperature ("Yes" in S105). In such case, the air-blower driving voltage of the air-blower decreases with a predetermined gradient so that an amount of air-blowing is decreased (S106).

As such, by decreasing the amount of air-blowing, a temperature of the thermoelectric device rises. As a result, a cooled air can be prevented from being supplied from the seat, when a user is requesting a heating.

Then, until the time t4, the air-blower is driven still in a low output. After the time t4, since the temperature ($\theta$d) of the thermoelectric device becomes equal to or larger than the target seat temperature ($\theta$sp) ("No" in the air-blower driving voltage approaches to the reference air-blower driving voltage with a predetermined gradient (S108)).

The present invention may be implemented with various kinds of modifications and combinations thereof and should be considered to be limited thereto. For example, in the above-described embodiment, the example is described in which the control means control the thermoelectric device and the air-blower, but in the present invention, the control means may only control the thermoelectric device. Further, the example is also illustrated in which the air-blower is controlled based on the preset tables, but as the control method of the air-blower, any preferable method may be optionally selected. In addition, the output of the air-blower may be controlled as a constant throughout the operation.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A temperature adjustable seat comprising;
a seat,
a thermoelectric device for heating and cooling air;
an air-blower blowing either heated air or cooled air by the thermoelectric device through an inside of the seat; and
a controller controlling the thermoelectric device;
said controller calculating a required heat quantity, said required heat quantity being a sum of a first heat quantity required for a seat surface temperature of the seat to reach a target seat temperature and a second heat quantity that is given and received between the seat and an ambient environment, and controlling a temperature of the thermoelectric device and an output of the air-blower so as to supply the required heat quantity to the seat.

2. A temperature adjustable seat according to claim 1 wherein said first heat quantity is expressed in a product of a temperature difference between the seat surface temperature and the target seat temperature and a heat capacity of the seat.

3. A temperature adjustable seat according to claim 1, wherein said second heat quantity is expressed in a product of a temperature difference between the seat surface temperature and an ambient environment temperature and a heat transfer coefficient between the seat and an ambient environment.

4. A temperature adjustable seat according to claim 1, wherein said controller calculates the required heat quantity by setting the first heat quantity to be zero in a case that a temperature difference between the seat surface temperature and the target seat temperature is equal to or less than a predetermined value.

5. A temperature adjustable seat according to claim 4, wherein said controller calculates a third heat quantity to be feedback based on a temperature difference between the seat temperature and the target seat temperature, and then calculates the required heat quantity by summing up the second heat quantity and the third heat quantity in a case that a temperature difference between the seat surface temperature and the target seat temperature is equal to or less than a predetermined value.

6. A temperature adjustable seat according to claim 5, wherein said controller calculates a target device temperature so that a supplied heat quantity, represented by a product of a temperature difference between the target device temperature and a temperature of the air to be heated or cooled and a heat transfer coefficient between the thermoelectric device and the air, becomes equal to the required heat quantity, and said controller controls an electric current supplied to the thermoelectric device so that a temperature of the thermoelectric device becomes the target device temperature.

7. A temperature adjustable seat according to claim 1, wherein said controller controls an output of the air-blower, based on a table being set according to a temperature of the air to be heated and an elapsed time, at a time of a heating operation, and said controller controls an output of said air-blower, based on a table being set according to a temperature of a thermoelectric device and an elapsed time, at a time of a cooling operation.

8. A temperature adjustable seat according to 1, wherein said controller controls the air-blower so as to increase an amount of air-blowing, when a target device temperature is higher than an upper limit temperature set in the thermoelectric device, and a temperature difference between a temperature of the thermoelectric device and the upper limit temperature is within a predetermined temperature, in a case of sending heated air to the seat.

9. A temperature adjustable seat according to claim 1, wherein said controller controls the air-blower so as to decrease an amount of air-blowing, when a supplied electric current of the thermoelectric device is an upper limit value set in the thermoelectric device, and a temperature of the thermoelectric device is lower than the target seat, temperature, in a case of sending heated air to the seat.

* * * * *

UNITED STATES PATENT AND TRADEMARK OFFICE
CERTIFICATE OF CORRECTION

| | | |
|---|---|---|
| PATENT NO. | : 8,002,344 B2 | Page 1 of 1 |
| APPLICATION NO. | : 12/268492 | |
| DATED | : August 23, 2011 | |
| INVENTOR(S) | : Toshiyuki Abe et al. | |

It is certified that error appears in the above-identified patent and that said Letters Patent is hereby corrected as shown below:

Add the following "Foreign Application Priority Data" to the cover page of the above-identified patent:

Foreign Application Priority Data

JP 2007-293143     November 12, 2007

Signed and Sealed this
First Day of May, 2012

David J. Kappos
*Director of the United States Patent and Trademark Office*